(12) United States Patent
Sørensen et al.

(10) Patent No.: US 11,470,838 B2
(45) Date of Patent: Oct. 18, 2022

(54) RAT AND VERMIN BARRIER SUITABLE FOR INSTALLATION IN A SEWAGE PIPE

(71) Applicant: SEWATECH APS, Viby J (DK)

(72) Inventors: Michael Lykke Sørensen, Mårslet (DK); Niels Hasager, Risskov (DK)

(73) Assignee: SEWATECH APS, Viby J (DK)

( * ) Notice: Subject to any disclaimer, the term of this patent is extended or adjusted under 35 U.S.C. 154(b) by 310 days.

(21) Appl. No.: 16/753,323

(22) PCT Filed: Oct. 2, 2018

(86) PCT No.: PCT/DK2018/050248
§ 371 (c)(1),
(2) Date: Apr. 2, 2020

(87) PCT Pub. No.: WO2019/068301
PCT Pub. Date: Apr. 11, 2019

(65) Prior Publication Data
US 2020/0236922 A1    Jul. 30, 2020

(30) Foreign Application Priority Data

Oct. 3, 2017   (DK) .......................... PA 2017 70752
Feb. 16, 2018  (DK) .......................... PA 2018 70096

(51) Int. Cl.
*A01M 29/30* (2011.01)
*E03F 7/06* (2006.01)

(52) U.S. Cl.
CPC .............. *A01M 29/30* (2013.01); *E03F 7/06* (2013.01)

(58) Field of Classification Search
CPC .................................. A01M 29/30; E03F 7/06
See application file for complete search history.

(56) References Cited

U.S. PATENT DOCUMENTS

| 3,118,469 A * | 1/1964 | Schliesser ................. E03F 7/06 |
| | | 137/527.8 |
| 2018/0044906 A1* | 2/2018 | McAlpine ................. E03F 7/06 |

FOREIGN PATENT DOCUMENTS

| DK | 1826326 T3 | 5/2011 |
| DK | 2113615 T3 | 8/2011 |

(Continued)

OTHER PUBLICATIONS

International Search Report and Written Opinion for PCT/DK2018/050248, dated Jan. 10, 2019, 10 pages.

(Continued)

*Primary Examiner* — Richard G Davis
(74) *Attorney, Agent, or Firm* — Blank Rome LLP (57) ABSTRACT

Barrier (1) for being installed at least partly within a sewage pipe, wherein said barrier (1) comprises two support wings (4) forming an outer shell of said barrier, one or more shutters (6), at least one shutter guide mechanism (7), and a mounting tube (8), and wherein said barrier (1) having a pipe shaped outer shell installable in the sewage pipe, and said barrier having a longitudinal axis X along said pipe shaped outer shell, wherein said shutter (6) is partly covered by said support wings (4), and wherein said support wings (4) are placed along the longitudinal axis X, wherein said support wings (4) are adapted to pivot about a wing hinge (10) positioned on a frame housing (9) of said barrier, wherein said barrier is adapted for having said shutter (6) capable of pivoting about a shutter hinge (15) provided in said frame housing (9) of said barrier, where said shutter (6) having a closed position and a more or less open position, where the shutter (6) is capable of pivoting from a substantially vertical closed position to an angular open position away from vertical in one direction along the longitudinal axis X, where said shutter guide mechanism (7) is capable of controlling said shutter movement direction from a first (Continued)

direction to a second direction opposite to the first direction, along the longitudinal axis X, and furthermore said shutter guide mechanism is capable of adjusting a shutter kip angle a, where shutter kip angle a is the angle from the shutters vertical closing position to maximum angular opening position, and said shutter guide mechanism (7) being capable of preventing the shutter to move in the respective opposite direction to the first or second direction along the longitudinal axis X.

9 Claims, 8 Drawing Sheets

(56) References Cited

FOREIGN PATENT DOCUMENTS

| EP | 1826326 | A2 | | 8/2007 | |
|----|---------|----|----|--------|----|
| EP | 2113615 | A1 | * | 11/2009 | ............... E03F 7/06 |
| EP | 2868823 | A1 | | 5/2015 | |
| EP | 2933392 | A1 | * | 10/2015 | ............... E03F 7/06 |
| EP | 3739136 | A1 | * | 11/2020 | |

OTHER PUBLICATIONS

Danish Search Report for PA 2017 70752, dated Mar. 15, 2018, 4 pages.

* cited by examiner

RAT AND VERMIN BARRIER SUITABLE FOR INSTALLATION IN A SEWAGE PIPE

This application is a national phase of International Application No. PCT/DK2018/050248, filed Oct. 2, 2018, which claims the priority of Danish Patent Application No, PA 2017 70752, filed Oct. 3, 2017 and Danish Patent Application No. PA 2018 70096, filed Feb. 16. 2018, The contents of which are incorporated herein by reference in their entirety.

FIELD OF THE INVENTION

The present invention relates to a barrier suitable for installation in a sewage pipe, and for allowing a sewage flow within the sewage pipe to pass the barrier, and where said barrier is adapted to prevent vermin, preferably rats or similar animals, from passing said barrier when installed in a sewage pipe.

BACKGROUND OF THE INVENTION

The installation of a barrier in a sewage pipe is not always an easy task. The barrier is placed in a sewage pipe in order to prevent vermin from passing the barrier.

DK1826326T3 and DK2113615T3 are two examples of prior art that address the problem of preventing vermin in the sewage pipe system by installation of a barrier in a sewage pipe through a manhole or an inspection hole.

DK1826326T3: The invention relates to a barrier for preventing rats or other vermin from entering a sewage pipe system. The barrier has a shutter pivotally suspended in the barrier about an axis and having a centre of gravity lying under the axis. The shutter is pivotal between a first angular position in which the at least one shutter is forming a first relatively larger angle with the direction of flow and at least substantially barring the aperture of the barrier, and a second angular position in which the at least one shutter is forming a second relatively smaller angle with the direction of flow keeping the aperture of the barrier at least partly open. Preferably, a second shutter is placed upstream of a first shutter and is pivotally suspended about a second axis and having a centre of gravity located under the second axis.

DK2113615T3: The present invention relates to a barrier for preventing rats or other vermin from entering a sewage pipe system, said barrier comprising at least one shutter pivotally suspended in the barrier about a first axis and having a centre of gravity lying under the axis, and said shutter being pivotal between a first angular position in which the at least one shutter is forming a first relatively larger angle with the direction of flow and at least substantially barring the aperture of the barrier, and a second angular position in which the at least one shutter is forming a second relatively smaller angle with the direction of flow keeping the aperture of the barrier at least partly open.

However, there are still a number of issues which need to be addressed in that the prior art does not sufficiently provide solutions which are reliable, stable and easy to use. For example, if the manhole is not cylindrical as is often the case where a cone-shaped manhole ring is placed uppermost in the manhole construction in order to provide the smallest possible opening in the road surface where access is normally gained, but where it is desirable to have a larger space further down the manhole, the solutions proposed by the prior art in order to install a barrier from the road surface into a sewage pipe some distance down the manhole are not easy to use, and requires special adaptations of the barrier and its mounting method.

A further issue which increases the cost of the barriers available on the market is the fact that depending on the flow of sewage through the pipe in which it is desirable to install a barrier the shutters are required to be able to pivot in one determined direction.

Consequently, it is necessary to manufacture, store and market barriers suitable for sewage flow/fluid flow in both directions.

OBJECT OF THE INVENTION

It is an object of this present invention to provide a barrier for preventing vermin such as rats from entering and/or travelling through a sewage pipe system. The barrier must be easily installable in a sewage pipe without the need of professional skills and knowledge. Also the configuration of the moving direction of the barrier's shutter or shutters, which depends on the sewage water flow, must be easy to alter before use.

Consequently, it is the object of the present invention to provide a barrier, which addresses these problems and additionally provides a number of further advantages.

At least within the present invention "upstream" and "downstream" shall be understood as relating to the flow of liquid in the pipe system.

DESCRIPTION OF THE INVENTION

The present invention addresses this by providing a barrier suitable to be mounted in a pipe system, in particular a sewage pipe in order to hinder rodents and vermin to be able to pass the barrier in the upstream direction, where said barrier comprises:
- two support wings pivotably mounted on a housing, where means are provided for mechanically urging each wing away or towards the other wing, such that in use when the barrier is mounted in a pipe system such that the housing's longitudinal axis (X) is parallel to the longitudinal axis of the pipe, the wings may be brought into contact with the inner side of a pipe in the pipe system;
- two shutters pivotally suspended from said housing, such that the shutters in a first position substantially barricades the pipe in which the barrier is mounted, and in a second position is pivoted into a position where only an upper section of the pipe is blocked.

The provision of two independent wings which may pivot independently of each other provides a centering function for the barrier construction. In order for the barrier to be firmly arranged inside the sewer it is important that the wings of the barrier construction achieve a high degree of interaction with the inner side of the pipe such that rodents or flushing of liquids in the pipe will not move/remove the barrier which would thereby loose its function.

As pipes used for sewers often have a not exactly circular cross section, or there might be other unevenness present on the surface of the inner sewage pipes the independency of the wings compensates for such inaccuracies and thereby allows the barrier to be mounted also in pipe systems which are not completely clean and even/smooth or completely circular.

Furthermore, in the art this problem has been addressed by providing resilient or elastic means in order to engage the wings with the inner side of the pipe system, but although the barrier may adjust to unevenness due to its elastic properties the forces with which the engagement between the barrier and the inner side of the pipe is created by means of the elastic forces have proven to be insufficient in many instances. Therefore, by providing a mechanical urging in combination with a spring force urging each wing towards the inner side a very large force may be imparted to the wings such that it is only the wings' elasticity that may cause improper engagement between the barrier and the inner side of the pipe system in which it is mounted.

Consequently, with the present invention the invented barrier addresses two connected problems, namely first to compensate for unevenness inside the pipe system and secondly to create a substantial engagement force due to the mechanical urging of the wings.

The means for urging the wings against the inside of the sewage pipe may comprise, in addition to other features, a mounting member.

The barrier is intended for installation in a sewage pipe system through a man-hole. The sewage pipe can be either an upstream or a downstream pipe. The part of the barrier, which has a pipe shaped body, is fixed into the sewage pipe by extending the support wings toward the inner surface of the sewage pipe. The remaining part of the barrier, which is not fixed in the sewage pipe, is accessible through the man-hole or the inspection-hole by using an extended tool, e.g. a shaft or a rod, which can be attached to the mounting member of the barrier.

A solution is provided regarding the shutter movement direction, which changes the direction of the shutter movement, so the same barrier may be fitted for an upstream or a downstream sewage pipe and changing the pivotal direction of the shutters by the shutter guide mechanism. By introducing the shutter guide mechanism, the shutter's movement direction can easily and rapidly be altered without using any force, but with the use of a tool or even without any use of tools. The solution using the shutter guide mechanism to change the shutter direction movement reduces time consumption when preparing the barrier for installation. The procedure of inserting the barrier into the sewage pipe is not complicated, and can easily be executed by a non-skilled person.

In a further advantageous embodiment of the invention said wings are provided with flanges upstanding relative to the housing and further that the means provided for mechanically urging each wing away or towards the other wing, comprises a central mandrel which can by urged against the upstanding flanges thereby urging the support wings away from each other.

By providing the outstanding flanges relative to the housing the means for urging will engage the upstanding flanges. Furthermore, the outstanding flanges will be provided excentrically to the pivot axis around which the wings are mounted such that a force on the flanges will cause the wings to pivot. In this manner it is possible by for example providing an engagement thread for the central mandrel to engage thereby creating the mechanical force urging it downwards against the upstanding flanges to create the force necessary to move the wings into a firm engagement with the inner side of the pipe.

In a further advantageous embodiment the mandrel in cooperation with the means provided for mechanically urging each wing away from or towards the other wing is further specified such that the means provided for mechanically urging each wing away or towards the other wing, comprises a central mandrel having a longitudinal axis (Y), which central mandrel in a first end is pivotably attached to the housing, such that the central mandrel may be rotated around the central mandrels longitudinal axis (Y), and where in a second end of the central mandrel a thread is provided, and further that between the first and second ends of the central mandrel a guide plate is concentrically mounted, such that the guide plate in one end is able to come into contact with an upper edge of the upstanding flanges of the wings and in the opposite end is in contact with a spring concentrically arranged around the central mandrel, where said spring in the end, not in contact with the guide plate may be in contact with a rotatable mounting member, said mounting member having a central aperture with a corresponding thread such that the mounting member may be threaded onto the second end of the central mandrel, and thereby compress or release the spring, where the mounting member further comprises a concentrically arranged cylindrical part partly overlapping part of the guide plate, and where guide pins mounted in the cylindrical part extends into grooves in the guide plate, said grooves are provided parallel to the longitudinal direction of the central mandrel.

The provision of a spring which spring force via the guide plate transfers the spring force to the flanges of the wings and thereby constantly urges and biases the wings into contact with the inner side of the pipe, provides a very strong and reliable mounting. Other prior art devices either rely on a threaded connection where the thread is tightened such that the wings are urged outwards due to the force from the tightening of a nut. This system has a tendency to fail when there are temperature fluctuations as the temperature fluctuations will cause the materials to change dimensions and thereby also change the pressure with which the wings are urged against the inside of the pipe.

In other prior art documents the elasticity of for example plastics are used in order to retain the wings in contact with the inner side of the pipe, but also here the changes in temperature will cause changes in flexibility and thereby how well the wings are retained by the pipe.

Furthermore, plastic materials are not suitable for being exposed to long-term pressure and as such the plastic will become brittle and eventually lose its ability/flexibility such that the barrier may become lose.

These drawbacks are effectively addressed by the fact that a constant spring force is biasing the wings outwards with a substantially constant force regardless of time and temperature, and as such a very reliable construction is obtained. Furthermore, the spring force is also effective when having to remove and inspect the barrier in that as the mounting member is unscrewed and thereby the spring force lessened and eventually removed the wings will collapse thereby making it easy to withdraw the barrier from the pipe.

The insertion of the barrier will often be easier if the mounting member is not fixed perpendicularly to the barrier, but may be operated in an angle away from 90°. This is solved be providing at pivotal mounting member making the access to the sewage pipe easier and faster. The barrier can maintain the same orientation as the sewage pipe when placing the barrier into a perfect position. The mounting member can therefore be rotated in a two dimensional or three dimensional direction relative to the barrier.

In a further advantageous embodiment of the invention, the mounting member is attachable to a barrier for installation of said barrier in a sewage pipe system. The barrier has a partly pipe-shaped outer shell installable in a sewage pipe, and said barrier having a longitudinal axis X along said partly pipe-shaped outer shell. The mounting member is placed in one end of said barrier, wherein the opposite end of said barrier is installable in said sewage pipe. One or more shutters are placed in the barrier. One or more support wings form the partly pipe-shaped outer shell of said barrier. The support wings are controllable by the mounting member, and the support wing can be pivoted along said axis x.

The mounting member is suitable for attachment to an extension device. The extension device makes it possible to install the barrier at a distance, for example when the barrier is installed at the bottom of a man-hole and it is desirable to operate the installation from a road surface some distance above said bottom of the man-hole.

The mounting member of the barrier is suitable for attachment of the extension device, and through the extension device it is possible to control the position of the support wings. The support wings have two main positions, one position when installing the barrier and another position when the barrier is installed in a sewage pipe and the barrier is in use. The support wings can be fixed and released when installing the barrier in the sewage pipe, from a remote position above the man-hole or the inspection-hole.

By turning the extending device attached to the mounting member clockwise or counter-clockwise, activating the resilient part of the mounting tube, which moves the support wings inward or outward, depending on whether the barrier is to be put in or taken out of the sewage pipe. The extending device attached to the mounting tube may also control the support wings by being pushed in and drawn out, activating the resilient part in the mounting mechanism, which moves the support wings inwards or outwards.

In a further advantageous embodiment the barrier is further provided with means for allowing the barrier to be installed in manholes which do not have a cylindrical cross-section. This is addressed by a barrier wherein the central mandrel may be tilted relative to the frame housing in a direction parallel to the longitudinal axis (x), and where upper edges of the upstanding flanges are curved in a direction parallel to the longitudinal axis (x).

As the central mandrel may be tilted, it is possible to arrange the mounting member in an angle relative to the longitudinal axis of the barrier such that it is possible to manipulate the barrier and in particular the wings into the pipe from a very wide angle due to the mounting member's ability to pivot. The curved upper edges of the flanges are shaped such that the guide plate during the pivotal movement may be in contact with the upper edge and therefore, when the spring force is released thereby urging the wing plates apart, a solid contact is established between the curve-shaped upper edges of the flanges and the guide plate.

One of the basic functions of a barrier of the type of the present invention is that the shutters cannot be opened by vermin and in particular rats when they try to pass upstream through the pipe system.

In the art various locking systems have been proposed for locking/blocking the pivotable action of the shutters in one direction whereas they shall of course allow liquid inside the pipe to flow in the downstream direction.

With the present invention various locking systems are proposed.

In a still further advantageous embodiment of the invention the shutters are mounted in a shutter guide mechanism, which mechanism is capable of adjusting the shutters pivotal movement along the longitudinal axis x, and furthermore also adjusting a shutter kip angle a, where the kip angle a is the angle in use from the shutters vertical closed position to an open position, where the shutters are arranged for pivotal movement around axles arranged perpendicular to the longitudinal axis (x), such that part of the shutter in use extends above the axles towards the frame housing where said shutter guide mechanism is arranged in the frame housing, where a moveable guide part is displaceable in the direction of the longitudinal axis (x), where said moveable guide part is arranged above the frame housing, and where the moveable guide part has two downwards projecting pins, said projecting pins projecting through a longitudinal slit in the frame housing such that the projecting pins may interfere with the pivotal movement of the part of the shutters extending above the axles.

By providing this shutter guide mechanism it is easy to change the pivotal direction of the shutters simply by arranging the pins on one side of the part of the shutters extending above the axles allowing the shutters to pivot in a first direction, and by arranging the pins on the other side of the part of the shutters extending above the axles the shutters are allowed to pivot in the opposite direction.

At the same time the pins will resist movement in the direction which it is not supposed to pivot thereby providing an efficient block hindering any undesirable pivoting of the shutters in an undesirable direction. Furthermore, the pins may be urged into contact with the part of the shutters extending above the axles such that the shutters at all times are pivoted relative to vertical.

This may be done in order to ensure that a certain minimum distance is available between the lowermost edge of the shutters and the bottom of the pipe in which they are installed. The angle is referred to as the shutter kip angle $\alpha$.

The barrier is adapted for having the shutter capable of pivoting about a shutter hinge provided in the frame housing of the barrier. The shutter has a closed position and a more or less open position. The shutter is capable of pivoting in use from a substantially vertical closed position to an angular open position away from vertical in a direction along the longitudinal axis X, where said shutter guide mechanism is capable of controlling said shutter movement direction from one direction to the opposite direction, along the longitudinal axis X. Furthermore, the shutter guide mechanism is capable of adjusting a shutter kip angle $\alpha$, where the shutter kip angle $\alpha$ is the angle from the shutter's vertical closing position to the maximum angular open position. The shutter guide mechanism will still be capable of preventing the shutter to move in the other direction to the one direction along the longitudinal axis X.

The shutter guide mechanism can be set, so that the shutter kip angle $\alpha$ is placed in a predetermined position. The position can be determined form the dimension of the sewage pipe relative to the waste material. The shutter kip angle $\alpha$ is also determining the distance between the perimeter of the shutter and the sewage pipe. If the shutter kip angle $\alpha$ is small, where the shutter kip angle $\alpha \rightarrow 0°$, the shutter covers more of the cross section of the sewage pipe than if the shutter kip angle $\alpha$ is larger, where the shutter kip angle $\alpha \rightarrow 90°$. If the shutter kip angle $\alpha$ is small, there will be a risk of blocking the waste material, and thereby also the flow of the sewage water in the barrier, which must be prevented. It is therefore preferred that the shutters leave a small space beneath the shutter relative to the sewage pipe, for allowing the wasted water and other sewage material to pass.

The shutter kip angle $\alpha$ is depending on the position of the projections. The projections are providing a limiter function, which blocks or limits the movement of the shutters and therefore also the shutter kip angle $\alpha$. When changing the position of the projections, the releasable fastening element is released, and the moveable guide part can be slid into a new position relative to the fixed guide part. When sliding the moveable guide part, the projections are also moved, because the projections are extending from the moveable guide part. The projections are in contact with parts of the shutters, preventing the shutters from moving past the point determined by the projections. When the moveable guide part is in the predetermined position, the releasable fastening element can be locked, so the position is kept steady. The shutter kip angle α is altered and the switch of the position is simple, easy and rapid.

In a further alternative embodiment of the mechanism which maintains the shutters in a blocked position in one direction and allows the shutters to open in the opposite direction, the invention in a further advantageous embodiment provides that said shutters are mounted in a shutter guide mechanism, which mechanism is capable of controlling the shutters' pivotal movement along the housing's longitudinal axis (x), where the shutters are arranged for pivotal movement around axles arranged perpendicular to the longitudinal axis (x), such that part of the shutter in use extends above the axles towards the housing where said shutter guide mechanism is arranged either integrally with the housing or is attached to the housing, where said shutter guide mechanism has two downwards projecting pins, such that the projecting pins may interfere and halt the pivotal movement of the part of the shutters extending above the axles. In a still further advantageous embodiment a pivotal locking member is provided, said locking member pivots around an axle parallel to the axles, where the locking member has a first sliding face adjacent the distal end of the part of the shutter which in use extends above the axles towards the housing of the, in use upstream shutter, where, as the upstream shutter pivots, the shutter's engagement with the sliding surface will cause the locking member to pivot, and that the locking member further comprises an engagement surface, which engagement surface in a first position blocks the pivotal movement of the, in use downstream shutter, and in a second position, said locking member, and thereby the engagement surface is pivoted by the upstream shutter's sliding along the sliding surface into a position allowing the downstream shutter to pivot freely relative to the engagement surface, and as shutters pivot back, the locking member is lifted and allows the shutters back into the first position, where the locking member pivots back into locking engagement with the downstream shutter.

With this embodiment, the two pins block any movement of the shutters in the upstream direction whereas when liquid flows in the pipe and urges the upstream shutter in a downstream direction, the uppermost part of the upstream shutter will engage the sliding surface on the pivotable member. The sliding surface is shaped such that the distance from the surface of the sliding surface towards the pivotable centre of the upstream shutter decreases as the shutter is pivoted whereby the pivotable member will be elevated thereby releasing the block on the downstream shutter. In this manner both shutters will be able to pivot when influenced by liquid running in a downstream direction once the water flow stops or diminishes, gravity will cause the upstream shutter to pivot back thereby sliding along the sliding surface in the opposite direction whereby the pivotable member is lowered whereby the engagement surface will reengage the top of the downstream shutter thereby locking the shutters again against a movement in the upstream direction. In this embodiment, the pivotable axis of the pivotable member is positioned upstream from the two shutters.

In a still further advantageous embodiment, a further alternative locking/blocking mechanism is disclosed where said shutters are mounted in a shutter guide mechanism which mechanism is capable of adjusting the shutters' pivotal movement along the housing's longitudinal axis (x), where the shutters are arranged for pivotal movement around axles arranged perpendicular to the longitudinal axis (x), such that part of the shutter in use extends above the axles towards the housing where said shutter guide mechanism has a pin 80 projecting downwards, such that the pin 80 interferes with and halts the pivotal movement of the, in use downstream shutter, in a first pivotal direction, and where a pivotal locking member is arranged for pivotal movement around an axle, said axle being parallel to the axles around which the shutters pivots, where said locking member in a first end adjacent the downstream shutter is provided with a cutback adapted to engage the uppermost part of the in use downstream shutter, and in an opposite second end is provided with a sliding surface, such that as the in use upstream shutter due to the influence of gravity pivots, the upper end of the shutter will urge the locking member to pivot, whereby the cutback of the locking member will engage the upper end of the in use downstream shutter, thereby blocking for further pivotal movement, where the locking member when not urged by the in use upstream shutter will pivot such that the cutback disengages the end of the in use downstream shutter.

In this embodiment, only one projecting pin is provided adjacent the downstream shutter. A pivotable member having a pivotable axis between the two shutters creates the locking mechanism such that in the position where the shutters are blocked against any movement, a cut-out section in the pivotable member engages the top end of the downstream shutter on the opposite side of the single projecting pin. In this manner, the downstream shutter is blocked against pivotable movement in any direction.

The upstream shutter is at this time due to gravity resting with its upper end against the second end of the pivotable member. As water flows in the pipe system thereby urging the upstream shutter to pivot, the upper end of the upstream shutter will be pivoted away from the pivotable member thereby allowing the pivotable member to pivot whereby the cutback section is released from its engagement with the downstream shutter which then is also allowed to pivot in a downstream direction. As the water flow in the pipe system subsides, gravity will urge the upstream shutter back whereby the upper end of the upstream shutter will cause the pivotable member to pivot back such that the cutback section in the first end of the pivotable member again will engage the upper end of the downstream shutter such that the pivotable member engages and blocks any pivotable movement together with the pin such that the downstream shutter is not able to be pivoted in any direction.

In a further advantageous embodiment of the invention, the shutter guide mechanism's moveable guide part is moveable in the direction along the longitudinal axis X.

One of the mounting positions of the shutter guide mechanism is at the top of the barrier, where the shutter guide mechanism is fixed to the frame housing. The shutter guide mechanism may also be placed on the side of the frame housing. The position of the shutters is easily moveable by moving parts of the shutter guide mechanism backwards and forward in a sliding movement along the longitudinal axis X, and no force is needed when operating the shutter guide mechanism. The sliding movement can be stepless or stepwise.

In a still further advantageous embodiment of the invention, the shutter guide mechanisms' said projections are placed at a predetermined distance from said shutter hinge, where the shutter may pivot in relation to the shutter hinge and be limited in the shutter movement direction by said projections.

The projections are providing a limiter function, which blocks or limits the movement of the shutters and therefore also the shutter kip angle a. The projections must therefore be placed near the shutters, where one or more projections per shutter may operate the shutter by limiting the shutter rotation around the shutter hinge.

The mounting member is suitable to receive an extension device. One or more pivotable mechanisms is attached to said mounting member, so that said mounting member is pivotally attached to said barrier through a mounting joint.

The extension device is used when installing the barrier into a sewage pipe through a man-hole or an inspection-hole. If the mounting member is perpendicular to the longitudinal axis X of the barrier, it is complicated to insert the barrier horizontally into the sewage pipe and at the same time still keep the mounting member and the extension attached to the mounting member in a vertical position. If the sewage pipe is not easy to access, the installation of the barrier can be unsuccessful, because the barrier cannot be properly fixed into the sewage pipe.

When part of the barrier is placed into a position inside the sewage pipe, the resilient part holds the support wings in a tight position against the sewage pipe's inner surface. The force from the resilient part will keep the support wings in position so that the support wings do not turn loose over time. Furthermore, the barrier stays in position even though waste material affects the barrier during the flow of the sewage water, or when the vermin tries to pull the shutters. The barrier will be resilient and maintain the position. This reduces the maintenance costs because the barrier does not need to be monitored and reinstalled.

When the barrier is in a position ready to be installed, the support wings are folded in and the resilient part is forced together. When the barrier is installed into the sewage pipe, the force from the resilient part is forcing the guide plate against the wing thereby acting indirectly on the support wings by keeping them in position.

In a preferred embodiment of the invention, said moveable resilient part comprises at least one moveable plate and at least one fixed plate. At least one resilient material is placed between said moveable plate and said fixed plate.

The resilient part may be fixed between two plates, holding the resilient unit fixed inside the resilient part. If the resilient part is a spring, then the stiffness and the deformation of the spring inside the resilient part is essential to the force needed to be applied to the resilient part, when the spring is compressed.

The present invention has provided solutions for improvement of the barrier functions which needed to be addressed, by providing easy and agile installation features and improved maintenance features of the barrier.

DESCRIPTION OF THE DRAWING

The embodiments of the invention are described in the following with reference to.

1. Barrier
2. Front part
3. Mounting joint
4. Support wing
5. Back part
6. Shutter
7. Shutter guide mechanism
8. Mounting tube
9. Frame housing
10. Wing hinge
11. Releasable fastening element
12. Moveable guide part
13. Fixed guide part
14. Projections
15. Shutter hinge
16. Resilient part
17. Tube connection part
18. Tube limiting mandrel
19. Frame connection part
20. Extended connecting part
21. Spring
22. Guide pins
23. Plate base
24. Guide plate
25. Centre mandrel
26. Moveable spring plate
27. Fixed spring plate

DETAILED DESCRIPTION OF THE INVENTION

The embodiments of the invention are described with reference to FIG. 1 to FIG. 5.

Figure 1A:
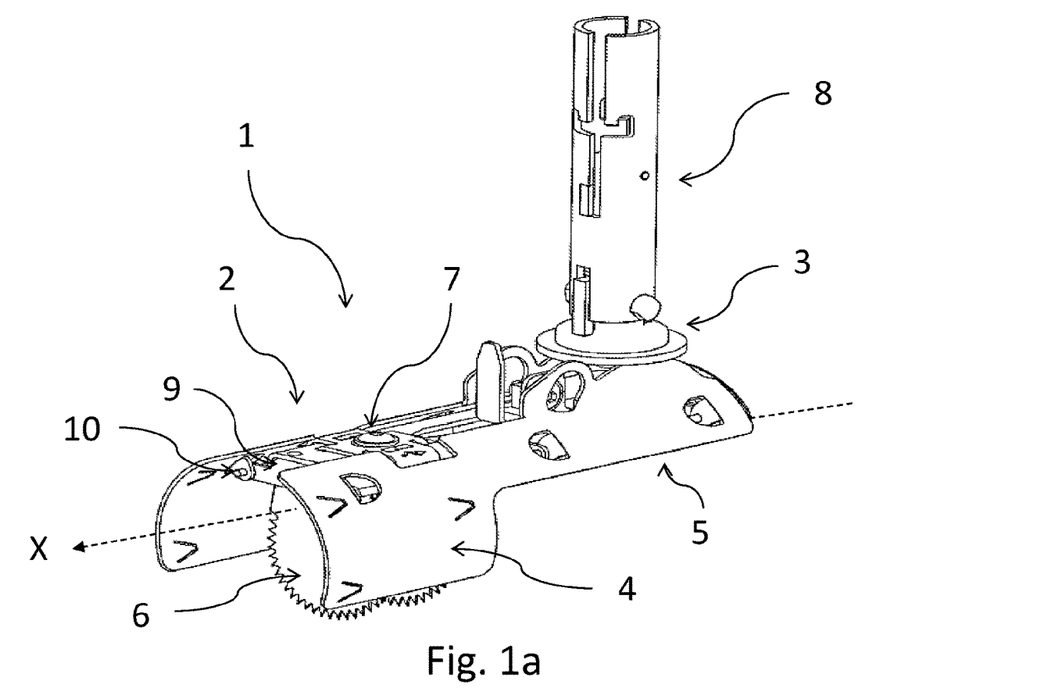
FIGS. 1a and 1b shows, in 2 different views, a barrier for installation in a sewage pipe system where the barrier is configured for being mounted at least partly within a sewage pipe.
Figure 1B:
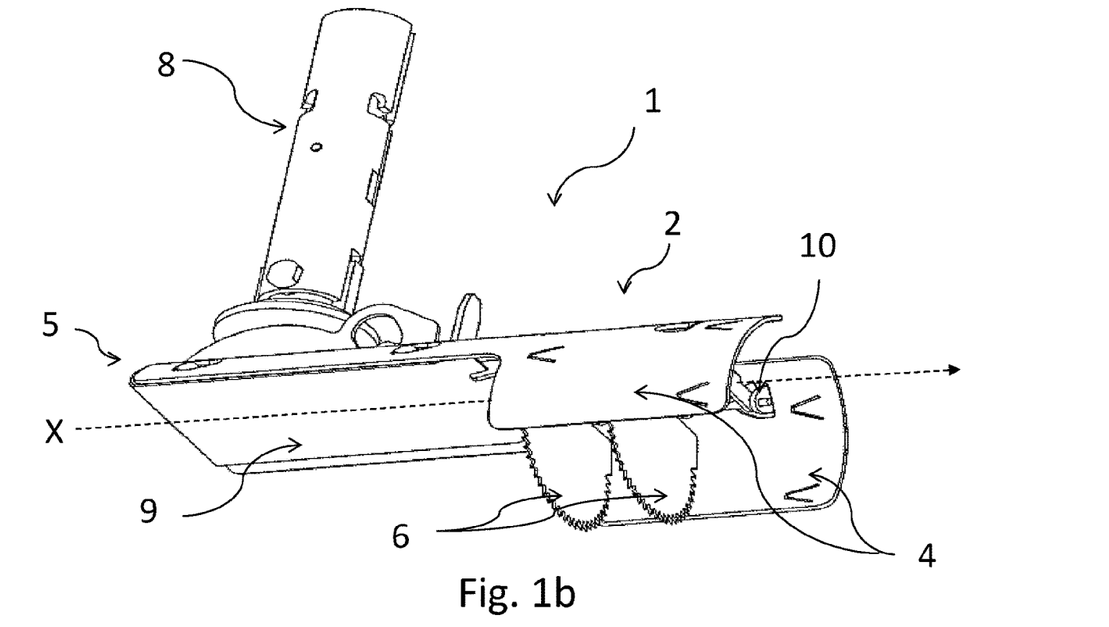

FIGS. 1a and 1b show a barrier 1 for installation in a sewage pipe system, where the barrier 1 is configured for being mounted at least partly within a sewage pipe.

FIG. 1a shows the barrier 1 having a partly pipe-shaped body (front part 2) installable in the sewage pipe. The barrier 1 extends along a longitudinal axis X along the frame housing 9 of the barrier 1. A front part 2 of the barrier 1 has an outer shell formed as a partly pipe-shaped body suitable to be inserted into the sewage pipe. When inserting the partly pipe-shaped body into the sewage pipe, the barrier's 1 front part 2 is moved in a direction of the longitudinal axis X into the sewage pipe. At an opposite end of the front part 2, at a back part 5 of the barrier 1, which is not intended to be inserted into the sewage pipe, a mounting and dismounting mechanism (52) is attached. The mounting mechanism (52)

comprises a mounting member 8 pivotally attached to the barrier using a mounting joint 3. The mounting member 8 is able to move in an angle with respect to the barrier 1, due to the mounting joint 3, when placing the front part 2 of the barrier 1 in the sewage pipe. The mounting member 8 is provided with an attachment for an extension device (not illustrated) e.g. a shaft or a rod, which will make it possible for a person installing the barrier 1 to move the barrier 1 into position in the sewage pipe, when the person installing the barrier 1 is operating the extension device through a manhole or an inspection hole.

The barrier 1 comprises two support wings 4 forming the partly pipe-shaped outer shell of the barrier 1. The support wings 4 are intended for having contact with the sewage pipe inner surface. The barrier 1 also comprises two wing hinges 10 which are located inside the barrier 1 parallel to the longitudinal axis X. The support wings 4 are pivotally attached to the wing hinges 10 parallel to the frame housing 9. Via the extension device attached to the mounting member 8, the support wings 4 are capable of being controlled and pivot around the wing hinge 10. When urging the support wings 4 against the sewage pipes inner surface, the barrier 1 is fixed in the sewage pipe.

The barrier 1 also comprises two shutters 6 attached to the frame housing 9 in the front part 2 of the barrier 1, and one shutter guide mechanism 7 which is attached to the frame housing 9 in the front part 2 of the barrier 1. The two shutters 6 are partly covered by the support wings 4. The movement direction of the shutters 6 is along the longitudinal axis X.

When installing the barrier 1 into the sewage pipe, the shutters movement direction must be determined before fixation of the barrier 1 in the sewage pipe. The sewage pipe can be an upstream pipe or a downstream pipe, and the shutters movement must react according to the direction of the flow of waste material. E.g. the shutters movement direction when upstream is one direction, and the shutters movement direction, when downstream is in another direction opposite to the one direction. The shutter guide mechanism 7 is capable of controlling the shutters movement direction from the one direction to the other direction, opposite to the one direction, along the longitudinal axis X.

Furthermore, the shutter guide mechanism 7 is capable of adjusting a shutter kip angle. When the shutters kip angle is adjusted, the shutter guide mechanism 7 will still be capable of preventing the shutter to move in the other direction to the one direction along the longitudinal axis X.

FIG. 1b shows the barrier 1 comprising two wing hinges 10, where the wing hinges 10 are located symmetrically on opposite sides of the frame housing 9, parallel to the longitudinal axis X. Each one of the support wings 4 is attached to the respective wing hinge 10. The mounting mechanism 52 of the barrier 1 is controlling the position of support wings 4, by pivoting the support wings 4 over the wing hinge 10. By pressing the support wings 4 against the sewage pipes inner surface, the barrier 1 is fixed to the sewage pipe.

The support wings 4 are placed symmetrically on opposite sides of a plane parallel to the longitudinal axis X, and the plane extending through the middle of the frame housing 9 of the barrier 1. The support wings 4 are adapted to pivot about a wing hinge 10 symmetrically positioned on each side the plan parallel to the longitudinal axis X along the frame housing 9 of the barrier 1.

The partly pipe-shaped barrier 1 is adapted for having the two shutters pivoting about shutter hinges 15 (showed in FIG. 2a) attached to the frame housing 9 of the barrier 1. The two shutters 6 have a closed position, and a more or less an open position. The shutters 6 are capable of pivoting from a substantially vertical closed position to an angular opened position away from vertical in one direction along the longitudinal axis X.

Figure 2A:
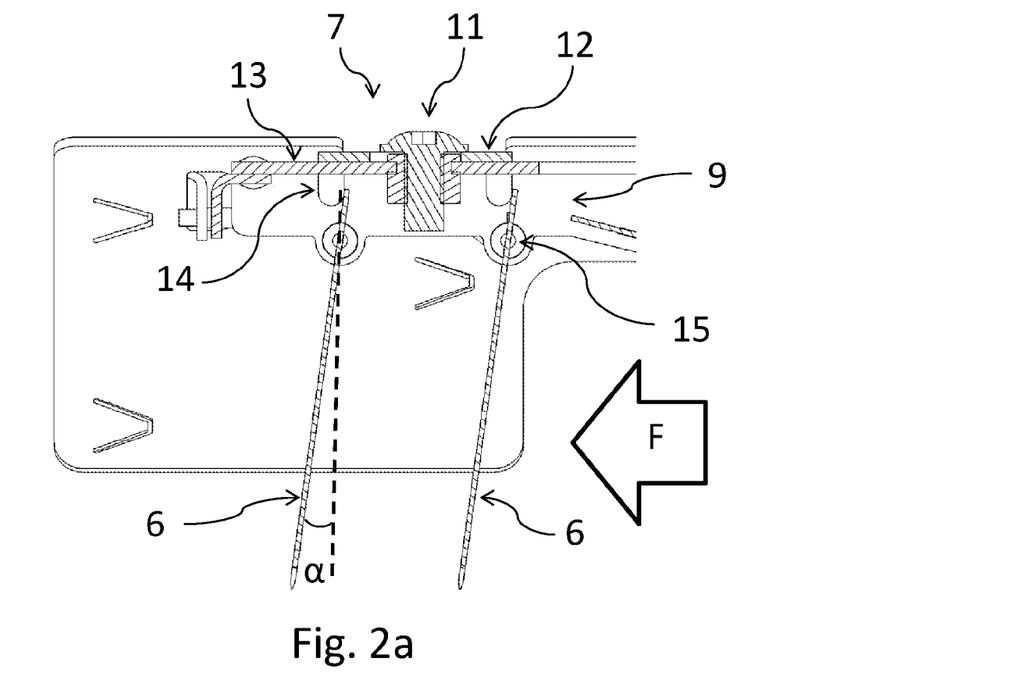
FIGS. 2a and 2b show a shutter guide mechanism installed in a barrier, when changing a shutter kip angle, FIG. 3 show a shutter guide mechanism installed in a barrier, when changing a shutter movement direction.
Figure 2B:
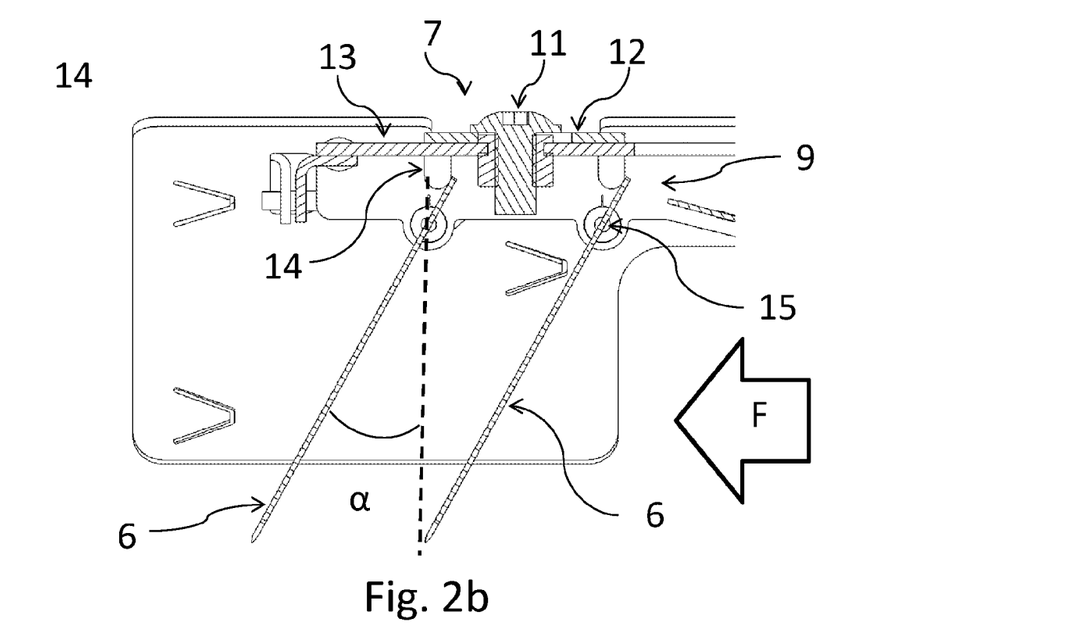

FIGS. 2a and 2b show a shutter guide mechanism 7 attached to the frame housing 9 in the front part 2 of the barrier 1. The shutter guide mechanism 7 is capable of adjusting a shutter kip angle $\alpha$, where the shutter kip angle $\alpha$ is the angle from the shutters vertical closed position to maximum angular opened position in the flow direction, shown by arrow F. The maximum angular opened position is determined by the configuration of the shutter guide mechanism 7. The shutter guide mechanism 7 is also capable of preventing the shutters moving in the other direction than the flow direction F.

The shutter guide mechanism 7 comprises a fixed guide part 13 (being part of the frame housing 9) and a moveable guide part 12 connected by a releasable fastening element 11. The fixed guide part 13 is fixed to the frame housing 9 of the barrier 1, substantially near the shutter hinges 15. Two projections 14 are extending from the moveable guide part 12, and the projections 14 are extending below the fixed guide part 13. The position of the moveable guide part 12 in respect to the fixed guide part is determining the projections 14 position and thereby also determining the shutter kip angle $\alpha$.

The shutter guide mechanisms 7 moveable guide part 12 is moveable in a direction parallel with the longitudinal axis X. The moveable guide part 12 is also moving the projections 14. The moveable guide part 12 is able to be moved back and forth in a sliding movement in a longitudinal slit (61), and thereby determine the shutter kip angle $\alpha$. The projections 14 are placed vertically higher than the shutter hinge 15 in a predetermined distance, where the shutter is capable of pivoting around the shutter hinge 15, using the projections 14 as a limiting point of movement. The projections 14 engage with a part of the shutters which in use are above the hinge axles (15).

The shutter movement, if not limited by the projections, is approximately ±90°, where 0° is the shutters axis passing through the hinge perpendicular to the longitudinal axis X.

FIG. 2a illustrates the shutter guide mechanism 7 moved into a position, where the shutters are blocked by projections 14 at a shutter kip angle $\alpha \rightarrow 0°$. The shutter is almost vertical, and the shutters therefore have a large degree of movement, limited only by the horizontal level adjacent to the frame housing 9. The shutter kip angle $\alpha$ is small, and the shutter kip angle $\alpha \rightarrow 0°$, the shutter covers most of the cross section of the sewage pipe.

FIG. 2b illustrates the shutter guide mechanism 7 moved into a position by releasing the releasable fastening element 11, and sliding the moveable guide part 12 in the slit (61) into a new position relative to the fixed guide part 13. When the moveable guide part 12 is in this position, the releasable fastening element 11 is locked, so the position is kept steady. The shutters 6 are blocked by projections 14 at a shutter kip angle $\alpha$ larger than shown in FIG. 2a. The shutters are also limited at the horizontal level by the frame 9. If the shutter kip angle $\alpha$ is larger, where the shutter kip angle $\alpha \rightarrow 90°$, the shutter covers less of the cross section of the sewage pipe, than if the shutter kip angle $\alpha$ is smaller, where shutter kip angle $\alpha \rightarrow 0°$.

Figure 3:
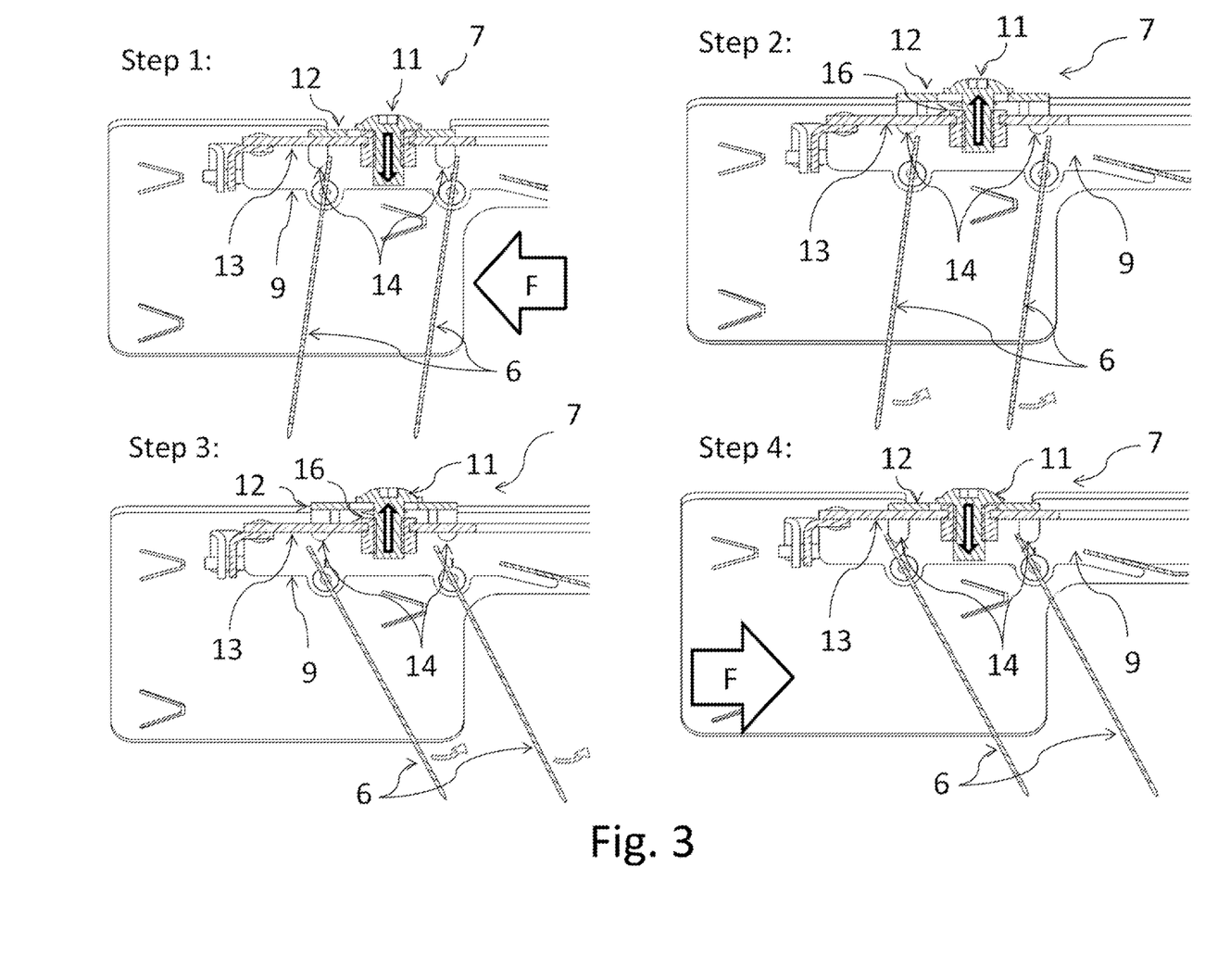

FIG. 3 shows the principle of changing shutters movement direction by using the shutter guide mechanism 7. The shutter guide mechanism 7 is capable of controlling the shutters movement direction from the one direction to the other direction opposite to the one direction. The shutter guide mechanism 7 still comprises a fixed guide part 13 and a moveable guide part 12 connected by a releasable fastening element 11. The fixed guide part 13 is fixed to the frame housing 9. Two projections 14 are extending from the moveable guide part 12 extending below the fixed guide part 13, where the moveable part 12 in respect to the fixed guide part 13 is capable of predetermining the projections 14 position, and thereby also determining the shutters movement direction.

Step 1 to 4 illustrate the function of the shutter guide mechanism 7, when altering the shutter movement direction. The shutter movement direction is changed from a downstream position to an upstream position.

Step 1: The shutter guide mechanism 7 is set in a position, where the shutter movement direction is set to a downstream sewage pipe, where the waste materials are flowing in flow direction F. The shutter guide mechanism 7 is in a closed downstream position. The releasable fastening element 11 is locked so that the moveable guide part 12 is maintaining the position in respect to the fixed guide part 13. The projections 14 with respect to the shutters blocked movement are therefore also maintaining the same position. The shutters 6 are therefore able to open in one direction and blocked in the other direction, opposite to the one direction, allowing any waste materials flow downstream in the flow direction F, away from a manhole or inspection hole preventing a vermin, such as a rat, from entering the sewage pipe.

Step 2: The shutter guide mechanism 7 is now set in an open position, where the moveable guide part 12 is pushed away from the fixed guide part 13 by a resilient part 16 e.g. a spring (or simply manually lifted), when the releasable fastening element 11 is released. The projections 14 attached to the moveable guide part 12, are moving with the moveable guide part 12. Movement of the shutters 6 past the vertical shutter position is now possible, and where the shutter part between the fixed guide part 13 and the shutter hinge 15 is passing the projections 14, when shifting the shutter movement direction.

Step 3: The shutter guide mechanism 7 is kept in the open position until the shutters 6 are moved into the correct position with respect to the projections 14. The open position is automatically maintained, because the moveable guide part 12 is maintained in a distance away from the fixed guide part 13 by the resilient part 16, and the releasable fastening element 11 is still kept released.

Step 4: The shutter guide mechanism 7 is set to a closed position, where the shutter movement direction is now changed to an upstream sewage pipe, where the waste materials are flowing in the flow direction F. The shutter guide mechanism 7 is now locked in a closed upstream position. The releasable fastening element 11 is locked so that the moveable guide part 12 maintains the position in respect to the fixed guide part 13. The projections 14 are therefore also maintaining the same position with respect to the shutters blocked movement. The shutters 6 are therefore able to open in one direction and blocked in the other direction opposite to the one direction, allowing any waste materials flow upstream in the flow direction F, preventing a vermin, such as a rat, from entering a manhole or an inspection hole.

Figure 4A:
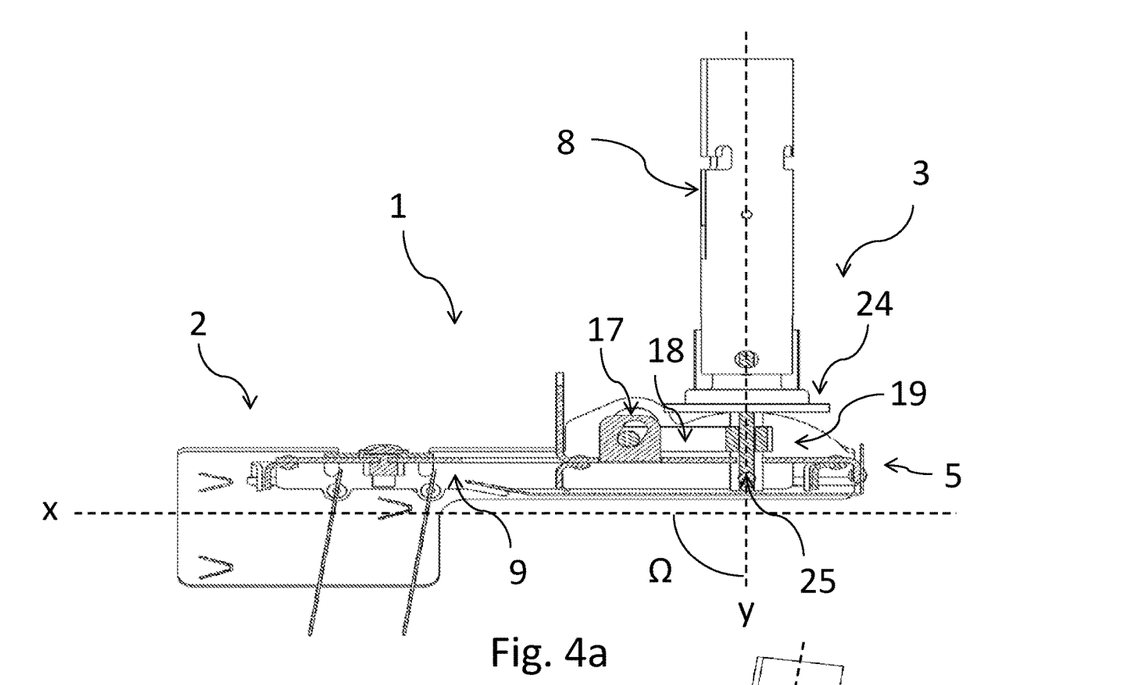
FIGS. 4a and 4b show a mounting tube attached to a barrier, pivoting in an angle with respect to barrier housing.
Figure 4B:
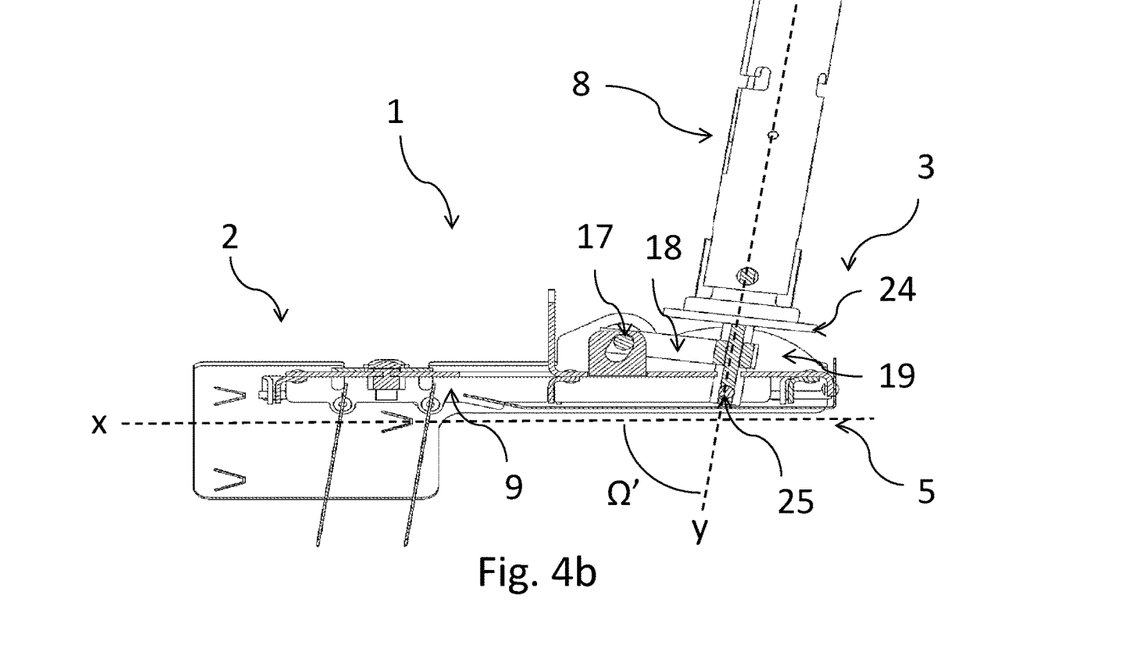

FIGS. 4a and 4b show a mounting member 8 attached to the barrier 1, pivoted in an angle (Ω) with respect to barrier 1. The mounting member 8 is suitable for attachment of an extension device, using the extension device when installing the barrier into the sewage pipe, through a manhole or an inspection hole. The installation process of the barrier is made easier, when using a mounting member 8 with pivotable mechanisms, to place the barrier into the position in the sewage pipe through for example a manhole or an inspection hole.

The barrier 1 extends along a longitudinal axis X. The mounting member 8 (mounting mechanism 52) is attached to the back part 5 of the barrier 1, using a mounting joint 3. The mounting joint 3 comprises a pivot limiting arrangement comprising a bar 18 extending from the centre mandrel (25). At the end of the bar (18) a flange (17) upstanding from the frame housing (9) is provided. In the flange (17) is provided a slit in which the movement of the bar (18) is limited, thereby limiting the tilt (and the angle Ω) of the central mandrel (25).

FIG. 4a illustrates that the centre mandrel 25 is connected inside the mounting member 8 as an extension. The centre mandrel 25 is attached to the frame housing 9. The guide plate 24 is attached to the mounting member 8, and is in contact with flanges 19 provided on the wings (4, 4') where the upper edges (56, 56') are curved. An axis y is parallel to the centre mandrel 25, extending through the centre of the mounting member 8, and is perpendicular to the longitudinal axis X, in the cross section forming an angle Ω.

FIG. 4b illustrates the guide plate 24, which is connected to the mounting member 8 as an extension. The guide plate 24 is in contact with flanges 19 provided on the wings (4, 4') where the upper edges (56, 56') of the flanges (19) are curved. The mounting member 8 is moved to another position away from a position where the axis y is perpendicular to the longitudinal axis X, and the angle Ω is less than 90°.

The mounting member 8 is moveable backwards and forwards within the limits of the slits in the flange 17, where the flange 17 determines the maximum variation of the angle Ω.

The flanges 19 may also have a semi-spherically shaped surface, where the moving joint 3, and therefore also the mounting member 8, is allowed to move within a substantial angle Ω. The axis y is in relation to the longitudinal axis X, and forms the angle Ω. The bar 18 is attached at one end to the centre mandrel 25, and in an opposite end the bar 18 is retained in a slit in the flange 17, which limit the movement of the mounting member 8, so that the angle Ω is within the predetermined limitations.

Figure 5A:
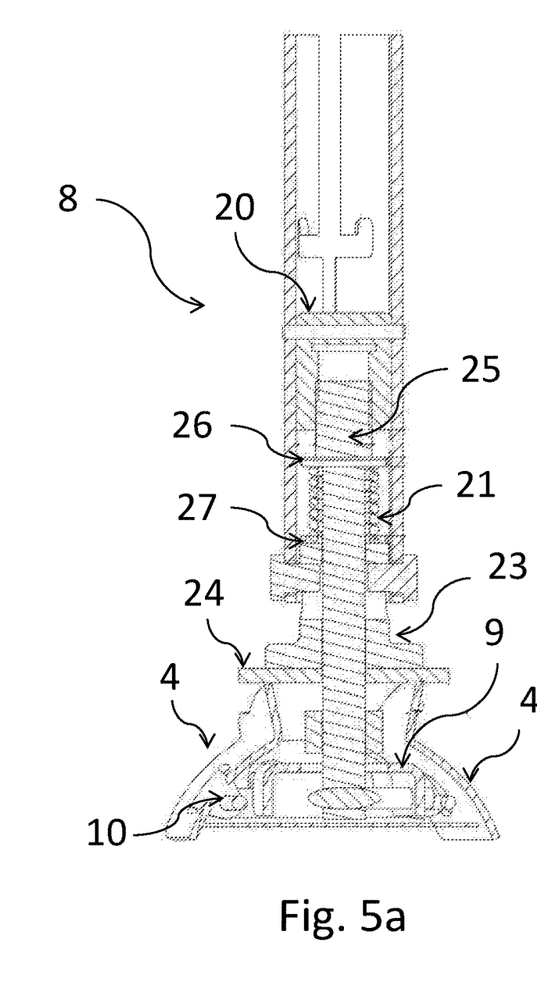
FIGS. 5a and 5b show a mounting tube intended for attachment to a barrier, changing the position of the support wings of the barrier, when installing the barrier in a sewage pipe system.
Figure 5B:
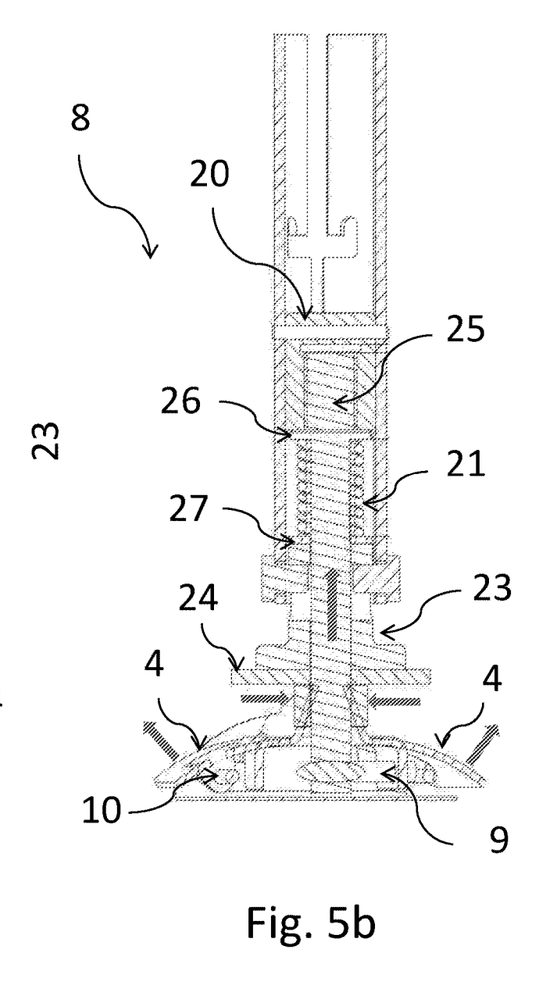
Figure 6A:
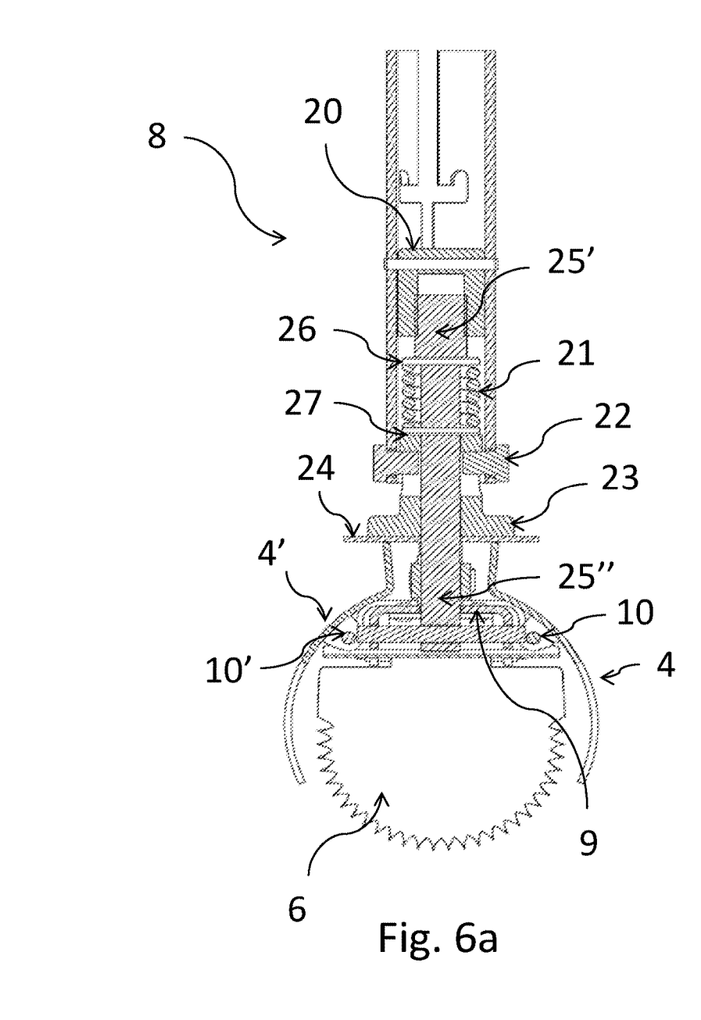
FIGS. 6a and 6b shows a mounting tube intended for attachment to a barrier, changing the position of the support wings of the barrier using a different resilient means than in FIG. 5, when installing the barrier in a sewage pipe system.
Figure 6B:
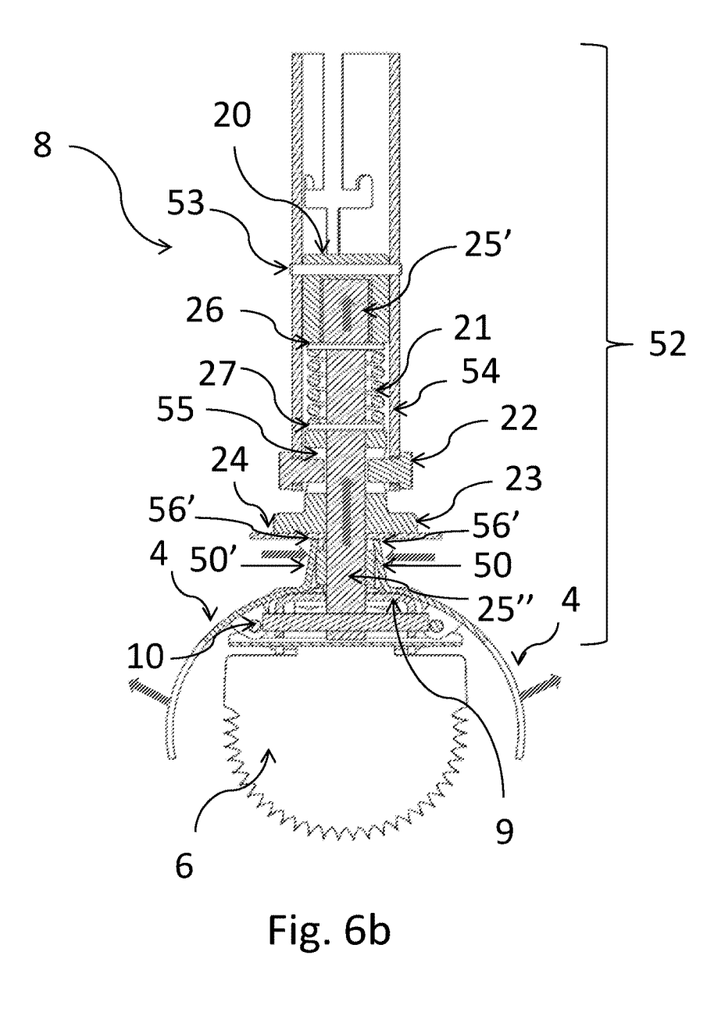

FIGS. 5a and 5b show a mounting member 8 attached to a barrier 1, for moving the wings 4 of the barrier 1, when installing the barrier 1 in a sewage pipe. FIG. 5a and FIG. 5b is a cross-sectional view of the mounting member 8 and the barrier housing 2. The barrier in FIG. 5a is set in an installable position (i.e. the wings (4) are in a collapsed position), and the barrier in FIG. 5b is in a fixed position when the barrier is installed in a sewage pipe (i.e. the wings are urged outwards into contact with the wall of the sewage pipe).

The mounting mechanism 52 comprises as already mentioned above a mounting member 8 which is in contact with the guide plate 24. The guide plate 24 has an aperture through which the central mandrel passes such that the guide plate is mounted substantially concentrically around the central mandrel. On top of the guide plate is arranged a spring which is also concentrically mounted around the mandrel. The mandrel 25 is in an upper part provided with a threaded section which threaded sections correspond to a thread provided inside the mounting member 8 such that the threaded section on the mounting member 8 may be threaded onto the end of the mandrel 25.

The mounting member comprises a concentrically arranged cylindrical part 54 which when mounted in the mounting mechanism overlaps the guide plate a certain distance. In the rotatable mounting member 53 is provided pins 22 which pins extend towards the central mandrel 25. The pins are arranged such that they engage longitudinal slits 55 provided in the guide plate. The longitudinal slits 55 are provided parallel to the longitudinal direction of the central mandrel 25.

Turning back to FIG. 5*a* the wings 4 are in a position where they are collapsed, i.e. where the diameter of the barrier is at a minimum such that the barrier is ready to be inserted into a sewage pipe. In this position the rotable mounting member 53 has been unscrewed in the matching threads between the central mandrel 25 and the rotatable mounting member 53. In this position the pins 22 have moved in the slits 55 to an upper position whereby the guide plate 24 is not being urged downwards towards the upstanding flanges 50, 50' of the wings 4. In this position the spring 21 is inactive.

After having inserted the barrier into the sewage pipe the mounting mechanism is activated, which is illustrated with respect to FIG. 5*d*. When activating the mounting mechanism the rotatable mounting member 53 is rotated such that the matching threads between the central mandrel 25 and the rotatable mounting member causes the rotatable mounting member to move downwards towards the guide plate 24 and the wings 4. The pins 22 will consequently travel downwards in the longitudinal slits 55 provided in the guide plate 24. At the same time the guide plate 24 will engage the upstanding flanges 50, 50' of the wings 4 thereby urging the wings outwards as indicated by the arrows. The wings 4 will pivot around the hinges 10 due to the increased pressure put on the upstanding flanges 50, 50'. Eventually, the rotatable mounting member 53 will have compressed the spring 21 in a position where the pins are not urging the guide plate upwards or downwards, but where the pins are situated substantially free of the ends of the longitudinal slits 55 provided in the guide plate.

At this position the spring 21 is urging the guide plate 24 downwards into contact with the upstanding flanges 50, 50' such that the wings 4 are urged outwards. The movement of the wings 4 is limited by the sidewalls of the sewage pipe such that a counter pressure will arise against the downwards movement of the guide plate 24 urged downwards by the spring force arising from the spring 21.

Due to the fact that it is the spring 21 that creates the force urging the wings into contact with the sides of the sewage pipe variations in temperature or other variations will be assimilated by the spring 21 in that the spring is compressed due to the downward force created by the rotatable mounting member 53 engaging the thread on the free end of the central mandrel 25.

The support wings are pivotally attached to the frame house 9, using wing hinges 10. The upper part of the support wings 10 are moveably in contact with a guide plate 24. A plate base 23 is adjacent to the other side of the guide plate 24, opposite the side of the support wings. The guide plate 24 and the plate base 23 have a centre aperture fitted such that the centre mandrel 25 can pass through. The guide plate 24 and the plate base 23 may be one unitary member.

A spring is placed inside the mounting member 8.

In FIG. 7*a*-7*f* is illustrated the construction of one shutter guide mechanism in various stages. In this embodiment, the shutter guide mechanism 7" is provided with a pivotable member 81 which in a first end 81' is provided with a cut-out 83. In the position illustrated in FIG. 7*a*, the cut-out portion 83 is tilted downwards such that it is in contact with the upper end of the downstream shutter 6. A pin 80 is provided which is also in engagement with the upper end of the downstream shutter 6, such that the downstream shutter 6 cannot pivot due to the mutual engagement of the upper end of the shutter between the pin 80 and the cut-out section 83. The upstream shutter 6' is due to gravity pivoted such that the upper end of the upstream shutter 6' is urged against the pivotable member 81 whereby the pivotable locking member 81 is kept in the position where the cut-out section 83 is engaging the upper end of the downstream shutter 6.

Figures 7A, 7B, 7C, 7D, 7E, 7F:
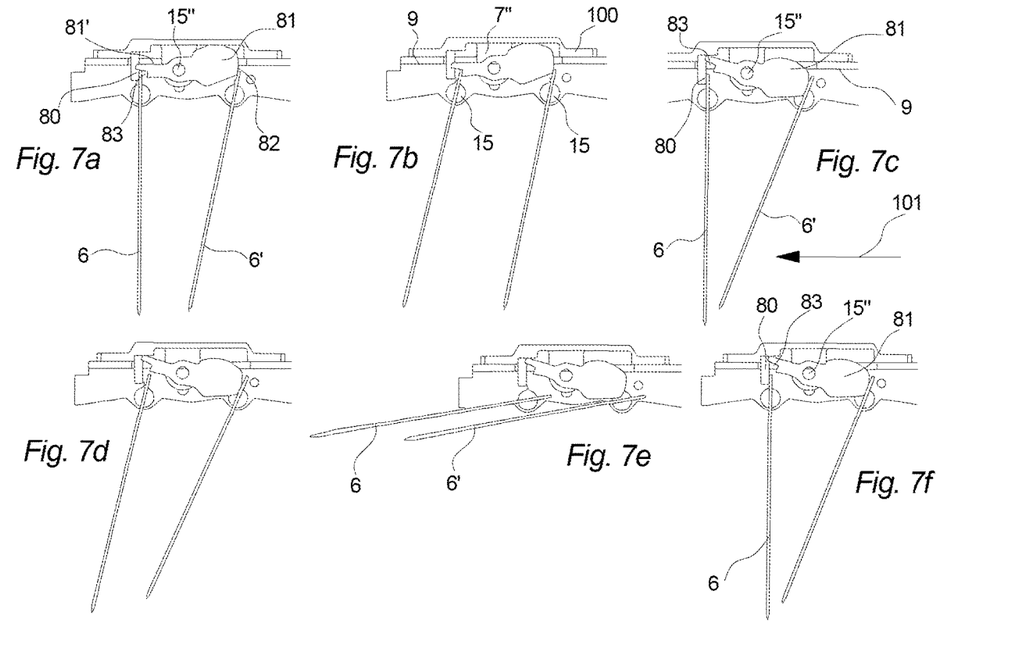
FIG. 7a-7f illustrates a first shutter guide mechanism including a pivotal locking member.

In FIG. 7*b* is illustrated a situation where a vermin (not illustrated) is travelling against the flow direction 101. In this position the downstream shutter 6 has engaged the cutback section 83 on the pivotable locking member 81 and the vermin can therefore not pivot the shutter and create passage pass the barrier.

In FIG. 7*c* is illustrated a situation where liquid flowing in the pipe system in which the barrier is mounted has pivoted the upstream shutter 6' such that it has released the pivotable locking member 81 which thereby rotates around its axle 15" whereby the cutback section 83 is elevated allowing the downstream shutter to pivot in one direction. In this situation the pivotable movement of the downstream shutter 6 is only blocked by the pin 80. Consequently, it is possible as illustrated in FIG. 7*d* for both shutters 6, 6' to pivot and thereby allow liquid and any solids suspended in the liquid to pass in a downstream direction. Illustrated in FIG. 7*e* is a situation where both shutters 6, 6' are pivoted into their max open position whereby the entire barrier only blocks a very small part of the flow area through the pipe system.

Once the liquid flow subsides, the shutters 6, 6' will due to gravity pivot back into a position as illustrated in FIG. 7*f*. In this position the downstream shutter 6 is blocked for further pivotable movement by the pin 80 and at the same time the upstream shutter 6' is engaging the engagement surface 82 on the second end of the pivotable locking member 81 whereby the pivotable locking member will be pivoted about its axle 15" such that the cut-out section 83 will engage the upper end of the downstream shutter 6 as illustrated with reference to FIG. 7*a*.

The entire shutter guide mechanism 7" is mounted in a mounting body 100 which in return is mounted in an aperture provided in the housing 9 in such a way that the mounting body may be removed or turned 180 degrees relative to the flow direction whereby the shutters will be able to be blocked or opened in a opposite direction relative to the housing 9.

Turning to FIG. 8*a*-8*g*, a further embodiment of a shutter guide mechanism 7' will be explained. In this embodiment two pins 60", 60''' are provided such that the shutters 6, 6' when pivoting in the upside direction will have their upper ends of the shutter 6, 6' engage the pins 60", 60''' such that further pivotable movement is arrested. The shutter, like is the case with the other embodiments, pivot around axles 15. In this embodiment a pivotable locking member 70 pivots about an axle 15' in order to carry out its locking action. In the position illustrated in FIG. 8*a*, both shutters are blocked such that they cannot pivot in an upstream direction and the downstream shutter 6 is by a cut-out section 83' provided in a first end 70' of the pivotable locking member 70 arrested against pivoting in the downstream direction. In this manner, a vermin trying to pivot the shutter 6 will not be able to pivot this shutter as the upper end of the shutter is blocked for any pivotable moment.

Figure 8A:
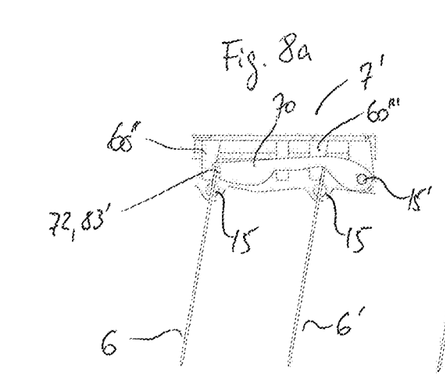
FIG. 8a-8g illustrates a second shutter guide mechanism including a pivotal locking member.
Figures 8B, 8C, 8E, 8F:
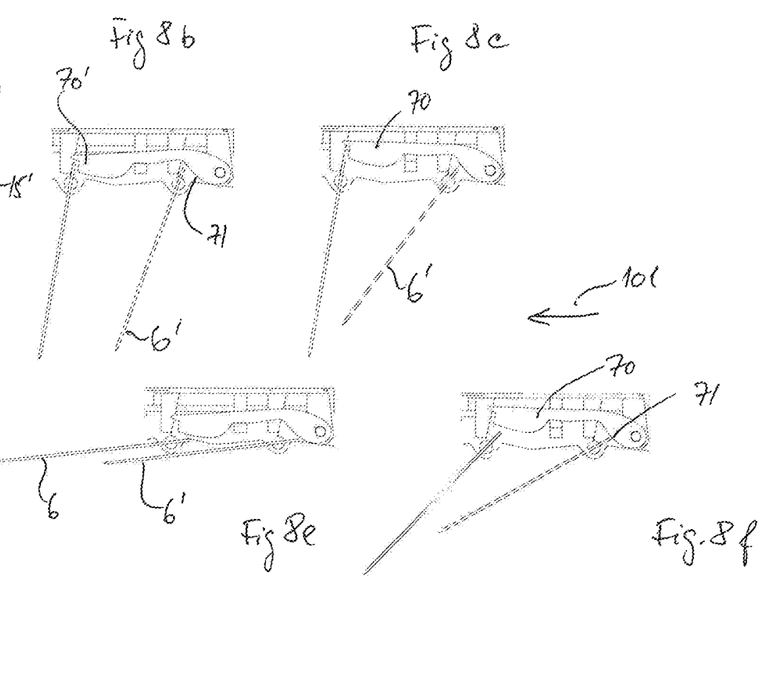
Figures 8D, 8G:
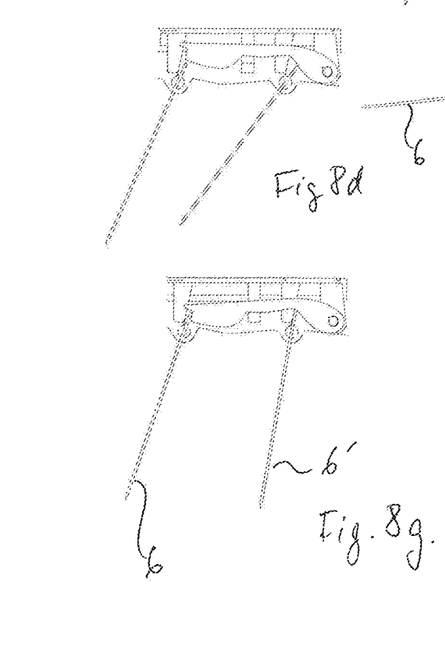

Turning to FIG. 8*b*, a situation where a downstream flow of liquid in the pipe system urges the upstream shutter 6' to pivot slightly is illustrated. As the water flow 101 urges the upstream shutter 6' to pivot, the upper end of the upstream shutter 6' will slide along the sliding surface 71. As the distance between the centre of the shutter's axle 15 and the sliding surface decreases, the pivotable locking member will be urged to pivot around its axle 15'. When the upstream shutter 6' has pivoted into a position illustrated with reference to FIG. 8c, the pivotable member 70 has been forced by the upper end of the upstream shutter 6' sliding along the sliding surface 71 to be pivoted sufficiently such that the engagement surface 72 of the cutback section 83 has released the upper end of the downstream shutter 6' such that the downstream shutter in this position may pivot influenced by the liquid flow in the pipe. This is illustrated in FIGS. 8d and 8e where it is clear that the downstream shutter 6 can pivot unhampered by the pivotable locking member 70 thereby allowing liquid to flow pass the barrier. In FIG. 8e is illustrated a situation where maximum liquid flow in the pipe system has caused both shutters to be in their max. pivotable position. In this position the pivotable locking member 70 has pivoted into its lowermost position where it is not engaging any of the upper ends of the shutter 6, 6'.

As the water flow subsides, the shutters will due to gravity pivot back towards an upright position. During this movement the upstream shutter 6' will again engage the sliding face 71 of the pivotable member 70 thereby pivoting the pivotable locking member 70 upwards allowing both shutters to attain an upright position as illustrated with reference to FIG. 8g which is identical to FIG. 8a. In this position the pivotable locking member 70 has again reached the position where the engagement surface of the cutback section 83' is engaging the downstream shutter as explained above thereby blocking the downstream shutter's 6 pivotable motion.

As was the case with the locking arrangement explained above with reference to FIG. 7a-7f, the shutter guide mechanism 7' illustrated with reference to FIGS. 8a-8g may also be arranged in a separate mounting body which, as was the case with the embodiment in the invention described with reference to FIGS. 7a - 7f, may be removed or replaced or turned around relative to the housing of the barrier.

The invention claimed is:

1. A barrier suitable to be mounted in a pipe system, in particular a sewage pipe in order to hinder rodents and vermin to be able to pass the barrier in the upstream direction, where said barrier comprises:
    two support wings pivotably mounted on a housing having a longitudinal axis, where means are provided for mechanically urging each wing away or towards the other wing, such that in use when the barrier is mounted in a pipe system such that the housing's longitudinal axis is parallel to the longitudinal axis of the pipe, the wings may be brought into contact with an inner side of the pipe in the pipe system;
    two shutters comprising an upstream shutter and a downstream shutter, said two shutters pivotally suspended from said housing, such that the shutters in a first position substantially barricade the pipe in which the barrier is mounted, and in a second position is pivoted to where only an upper section of the pipe is blocked; where the shutters are arranged for pivotal movement around shutter axles arranged perpendicular to the longitudinal axis of the housing;
    a pivotal locking member:
        said locking member pivots around an axle parallel to the shutter axles, where the locking member has a first sliding face adjacent the distal end of a part of the shutter which in use extends above the shutter axles towards the in-use upstream shutter, where, as the upstream shutter pivots, the upstream shutter's engagement with the first sliding face will cause the locking member to pivot, and that the locking member further comprises an engagement surface, which engagement surface in a first position blocks the pivotal movement of the in-use downstream shutter, and in a second position, said locking member, and thereby the engagement surface is pivoted by the upstream shutter sliding along the first sliding face into a position allowing the downstream shutter to pivot freely relative to the engagement surface, and as the shutters pivot back, the locking member is lifted and allows the shutters back into the first position, where the locking member pivots back into locking engagement with the downstream shutter; or
    where the pivotal locking member is arranged for pivotal movement around the axle, said axle being parallel to the shutter axles around which the shutters pivot, where said locking member in a first end adjacent the downstream shutter is provided with a cutback adapted to engage an uppermost part of the in-use downstream shutter, and an opposite second end is provided with a sliding surface, such that as the in-use upstream shutter pivots due to the influence of gravity, an upper end of the shutter will urge the locking member to pivot, whereby the cutback of the locking member will engage the upper end of the in-use downstream shutter, thereby blocking for further pivotal movement, where the locking member when not urged by the in use upstream shutter will pivot such that the cutback disengages the end of the in-use downstream shutter.

2. The barrier according to claim 1, where said wings are provided with flanges upstanding relative to the housing and further that the means provided for mechanically urging each wing away or towards the other wing, comprises a central mandrel which can by urged against the upstanding flanges thereby urging the support wings away from each other.

3. The barrier according to claim 2 wherein the central mandrel may be tilted relative to the housing in a direction parallel to the housing's longitudinal axis, and where upper edges of the upstanding flanges are curved in a direction parallel to the longitudinal axis.

4. The barrier according to claim 1, where a locking arrangement is provided for maintaining at least the downstream shutter in the first position when the shutter is manipulated to be opened from the downstream direction, where said locking arrangement includes a pivotal locking member, which pivotal locking member can be pivoted from a first position blocking the pivotal movement of the downstream shutter to a second position, where the shutter is allowed to pivot.

5. The barrier according to claim 1, where the means provided for mechanically urging each wing way or towards the other wing, comprises a central mandrel having a longitudinal axis, which central mandrel in a first end is pivotably attached to the housing, such that the central mandrel may be rotated around the central mandrels longitudinal axis, and where in a second end of the central mandrel a thread is provided,
    and further that between the first and second ends of the central mandrel a guide plate is concentrically mounted, such that the guide plate in one end is able to come into contact with an upper edge of the upstanding flanges of the wings and in the opposite end is in contact with a spring concentrically arranged around the central mandrel, where said spring in the end, not in contact with the guide plate may be in contact with a rotatable mounting member, said mounting member having a central aperture with a corresponding thread such that the mounting member may be threaded onto the second end of the central mandrel, and thereby compress or release the spring, where the mounting member further comprises a concentrically arranged cylindrical part partly overlapping part of the guide plate, and where guide pins mounted in the cylindrical part extends into grooves in the guide plate, said grooves are provided parallel to the longitudinal direction of the central mandrel.

6. The barrier according to claim 1, where said shutters are mounted in a shutter guide mechanism, which mechanism is capable of adjusting and/or controlling the shutters' pivotal movement along the housing's longitudinal axis, where the shutters are arranged for pivotal movement around axles arranged perpendicular to the longitudinal axis, such that part of the shutter in use extends above the axles towards the housing where said shutter guide mechanism is arranged in the housing, where a moveable guide part is displaceable in the direction of the longitudinal axis, where said moveable guide part is arranged above the frame housing, and where the moveable guide part has two downwards projecting pins, said projecting pins projecting through a longitudinal slit in the frame housing such that the projecting pins may interfere with the pivotal movement of the part of the shutters extending above the axles, thereby adjusting the shutters' pivotal movement along the housing's longitudinal axis.

7. The barrier according to claim 6 where said shutter guide mechanism is a separate part, said part having a mounting body, where the housing of the barrier has an aperture suitable to receive and retain said mounting body, and where said mounting body may be arranged in the aperture in two opposite directions, thereby allowing the shutters to operate in two opposite directions.

8. The barrier according to claim 1 wherein at least one shutter is provided with pointed tips extending out from and along at least part of the shutter's perimeter.

9. A barrier suitable to be mounted in a pipe system, in particular a sewage pipe in order to hinder rodents and vermin to be able to pass the barrier in the upstream direction, where said barrier comprises:

two support wings pivotably mounted on a housing having a longitudinal axis, where means are provided for mechanically urging each wing away or towards the other wing, such that in use when the barrier is mounted in a pipe system such that the housing's longitudinal axis is parallel to the longitudinal axis of the pipe, the wings may be brought into contact with an inner side of the pipe in the pipe system;

two shutters comprising an upstream shutter and a downstream shutter, said two shutters pivotally suspended from said housing, such that the shutters in a first position substantially barricade the pipe in which the barrier is mounted, and in a second position is pivoted to where only an upper section of the pipe is blocked, where said shutters are mounted in a shutter guide mechanism, which mechanism is capable of controlling the shutters' pivotal movement along the housing's longitudinal axis, where the shutters are arranged for pivotal movement around axles arranged perpendicular to the longitudinal axis, such that part of the shutter in use extends above the axles towards the housing where said shutter guide mechanism is arranged either integrally with the housing or is attached to the housing, where said shutter guide mechanism has two downwards projecting pins, such that the projecting pins may interfere and halt the pivotal movement of the part of the shutters extending above the axles in a first pivotal direction.

* * * * *